United States Patent Office 3,796,688
Patented Mar. 12, 1974

3,796,688
POLYESTERS FROM 4,4'-BIS(2-HYDROXY-
ETHOXY)-TETRAPHENYLMETHANE
Ewald Schneider, Kufstein, Tyrol, Austria, assignor to
Ciba-Geigy A.G., Basel, Switzerland
No Drawing. Filed Apr. 17, 1972, Ser. No. 244,875
Claims priority, application Austria, Apr. 21, 1971,
3,417/71
Int. Cl. C08g 17/08
U.S. Cl. 260—47 C 4 Claims

ABSTRACT OF THE DISCLOSURE

This invention relates to heat-stable, thermoplastic saturated polyesters synthesized from aromatic dicarboxylic acids, in particular terephthalic acid, optionally with small amounts of aliphatic dicarboxylic acids, and from 4,4' - bis(2-hydroxyethoxy)-tetraphenylmethane, optionally with aliphatic and/or cycloaliphatic diols and small amounts of a crosslinking component.

---

This invention relates to heat-stable, thermoplastic saturated polyesters synthesized from aromatic dicarboxylic acids, in particular terephthalic acid, optionally with small amounts of aliphatic dicarboxylic acids, and from 4,4'-bis(2-hydroxyethoxy)-tetraphenylmethane, optionally with aliphatic and/or cycloaliphatic diols and small amounts of a crosslinking component.

Saturated polyesters from aromatic dicarboxylic acids and aliphatic or cycloaliphatic diols are known. For example, in British Pat. 793,907 polyesters are disclosed which contain up to 30 mol percent of bis(2-hydroxyethoxy)-diphenylpropane residues in relation to the acid component. These polyesters have high softening temperatures but the freezing temperatures are relatively low, i.e. below 80° C. At temperatures above the freezing point the shape and dimensional stability of the transparent articles, especially the amorphous ones, moulded with these polyesters, is very limited.

Polyesters with relatively high softening temperatures produced from 4,4'-dihydroxytetraphenylmethane and terephthalic dichloride are described in the published German patent application 1,915,374. Their production is laborious and owing to the high melting points (above 360° C.) they require exceptionally high moulding temperatures with long moulding cycle times.

Surprisingly, it has been found that by using 4,4'-bis(2-hydroxyethoxy)-tetraphenylmethane as diol component thermoplastic saturated polyesters with freezing temperatures up to 120° C. can be produced by means of conventional production processes. The higher freezing temperatures enable these polyesters to be be used for a considerably wider range of applications.

This invention therefore relates to thermoplastic polyesters which are distinguished by consisting of (a) aromatic dicarboxylic acids, in particular terephthalic acid, or their dialkyl esters and, optionally, small amounts of aliphatic dicarboxylic acids;
(b) 4,4'-bis(2-hydroxyethoxy)-tetraphenylmethane;

and, optionally, (c) other aliphatic or cycloaliphatic diols, in particular ethylene glycol, optionally with small amounts of crosslinking components.

Polyesters in which the diol component consists of 5, preferably 30 to 100 mol percent of 4,4'-bis(2-hydroxyethoxy)tetraphenylmethane radicals are preferred.

The new polyesters, which have softening points ranging from 220° C. to 260° C., are especially notable for the shape and dimensional stability they show at relatively high service temperatures. Articles moulded with these polyesters are resistant to hydrolysis and can be sterilized with water vapor; they show good transparency and are resistant to ageing and weathering. They are suitable for the production of spun filaments, extruded films, injection moulded goods, and coatings, e.g. powder coatings. The main areas of use are technical components, housings, containers, packaging films, tiles, solid profiled mouldings, hollow articles, and in particular electrical coils, cores and terminals, and screening disks for lamps and traffic control light signals.

The 4,4' - bis(2 - hydroxyethoxy)-tetraphenylmethane used as diol component in this invention can be produced, for example, from 4,4'-dihydroxytetraphenylmethane, the production of which is described in Austrian Pat. 284,100: One mol of 4,4'-dihydroxytetraphenylmethane is dissolved in 1500 ml. of methanol with the aid of 4 mols of NaOH as 50% aqueous solution. 4 mols of ethylene chlorohydrin are added and the mixture is reacted for 2½ hours under reflux. The NaCl formed is filtered off and the mixture allowed to cool, on which the colorless reaction product settles out in crystalline form. Small amounts of monoethoxylated bis-phenol are eliminated by recrystallization from methanol. The resulting 4,4'-bis(2-hydroxyethoxy)-tetraphenylmethane, melting point 160° C., is obtained in 60 to 90% yield. Ethylene oxide is a suitable alternative for ethoxylation of the bis-phenol.

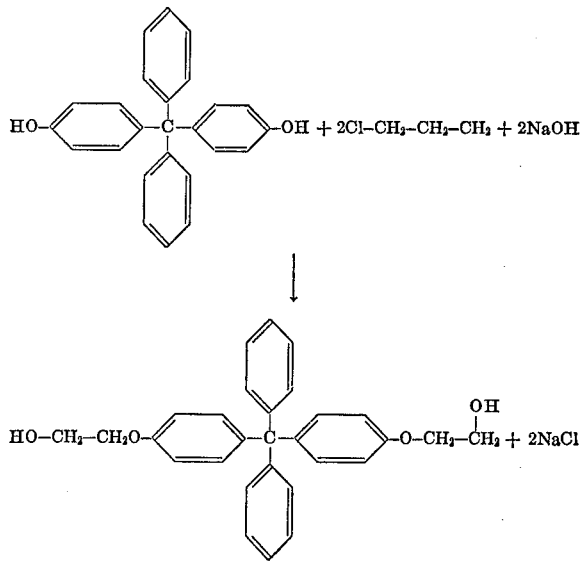

The polyesters according to this invention are synthesized according to known methods, the reaction mixture being heated at temperatures from 200° C. to 300° C. in the presence of known transesterification and polycondensation catalysts, and the polycondensation carried out at a pressure reduced to less than 0.3 torr.

The following examples are intended to illustrate the invention further. The parts given therein are by weight, the percentages (percent) are molecular percentages. The freezing temperatures ($T_G$) were determined with the aid of the Perkin-Elmer Differential Calorimeter DSC–1B using samples which had been previously melted at 300° C., tempered for 5 minutes, chilled and heated up at the rate of 16° C. a minute. The freezing temperature is taken as the point at which an abrupt increase in the specific heat is recorded in the thermogram.

The intrinsic viscosity was determined at 30° C. using a solution of 1 g. of the polyester in 100 ml. of a mixture of equal parts of phenol and tetrachlorethane.

EXAMPLE 1

254 parts of terephthalic diglycol ester and 440 parts of 4,4' - bis(2 - hydroxyethoxy) - tetraphenylmethane are mixed with 0.08 part of a 70:30 antimony-lead alloy with a particle size range of up to 45 microns. The mixture is heated to 230° C., on which distillation of the glycol begins. After 30 minutes the temperature is increased further to 275° C. and the pressure reduced at the same time. Polycondensation is carried out at this temperature at a vacuum of less than 0.3 torr. The resulting polyester has an intrinsic viscosity of 0.70 dl./g. and a freezing temperature of 122° C.

A polyester of this type is suitable for the injection moulding of electrical coils, cores and terminals at barrel temperatures of 250° C. in the feed section, 260° C. in the middle section and 270° C. in the ejection section, 40° C. mould temperature and 60 seconds moulding cycle time. These electrical components show good shape stability at high temperatures and pronounced stiffness which prevents deformation.

In contrast to this polyester, a polyester produced by the same process under exactly the same conditions but using as diol component 4,4'-bis(2-hydroxyethoxy)-diphenylpropane has an intrinsic viscosity of 0.72 dl./g. and a freezing temperature of only 77° C.

EXAMPLES 2-6

To a mixture of 300 parts of dimethyl terephthalate, 210 parts of ethylene glycol and the amount of 4,4'-bis-(2-hydroxyethoxy)-tetraphenylmethane given in Table 1 is added with 0.024 part of zinc powder and 0.24 part of a 70:30 antimony-lead alloy in powder form. The mixture is raised to 190° C. in the absence of atmospheric oxygen, on which transesterification begins with distillation of methanol. After 75% of the methanol has distilled off, the temperature is increased to 220° C. and transesterification continued to the end-point. Then the temperature is raised further to 240° C. to distill off the excess glycol. Subsequently it is brought up to 275° C. with simultaneous reduction of the pressure and polycondensation carried out at this temperature at 0.3 torr vacuum pressure.

The intrinsic viscosity and the freezing temperature of the pertinent polyester are given in Table 1. The polyesters thus produced are suitable for extrusion and injection moulding in the form of films, coatings or technical components.

TABLE 1

| Example number | Amount of 4,4'-bis-(2-hydroxyethoxy)-tetraphenylmethane | | Properties of resulting polyester | |
|---|---|---|---|---|
| | Parts by weight | Mol. percent | Intrinsic viscosity in dl./g. | Freezing temperature in ° C. |
| 1 | 440 | 100 | 0.70 | 122 |
| 2 | 340 | 50 | 0.65 | 107 |
| 3 | 204 | 30 | 0.68 | 100 |
| 4 | 136 | 20 | 0.70 | 94 |
| 5 | 68 | 10 | 0.63 | 87 |
| 6 | 34 | 5 | 0.76 | 80 |

Having thus disclosed the invention, what I claim is:
1. A thermoplastic polyester consisting essentially of a condensation product of
   (a) a dicarboxylic acid component consisting essentially of terephthalic acid or a dialkyl ester of terephthalic acid; and
   (b) a diol component consisting essentially of (1) 5 to 100 mole percent based on (a) of 4,4'-bis(2-hydroxyethoxy)-tetraphenylmethane; and (2) from 0 to 95 mole percent based on (a) of ethylene glycol.
2. A thermoplastic polyester according to claim 1 wherein said diol component is 4,4' - bis-(2 - hydroxyethoxy)-tetraphenylmethane.
3. A thermoplastic polyester according to claim 1 wherein the 4,4'-bis(2-hydroxyethoxy)-tetraphenylmethane is present in an amount of from 30 to 100 mole percent based on the weight of (a).
4. A heat stable molded article consisting essentially of the thermoplastic polyester of claim 1.

References Cited
UNITED STATES PATENTS
3,477,989  11/1969  Zorn et al.
FOREIGN PATENTS
1,915,374  10/1970  Germany.

MELVIN GOLDSTEIN, Primary Examiner